(12) United States Patent
Wyatt et al.

(10) Patent No.: US 9,342,181 B2
(45) Date of Patent: May 17, 2016

(54) TOUCH-SCREEN INPUT/OUTPUT DEVICE TOUCH SENSING TECHNIQUES

(71) Applicant: NVIDIA Corporation, Santa Clara, CA (US)

(72) Inventors: David Wyatt, San Jose, CA (US); Arman Toorians, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 57 days.

(21) Appl. No.: 13/732,213

(22) Filed: Dec. 31, 2012

(65) Prior Publication Data

US 2013/0176251 A1 Jul. 11, 2013

Related U.S. Application Data

(60) Provisional application No. 61/584,798, filed on Jan. 9, 2012.

(51) Int. Cl.
*G06F 3/041* (2006.01)
*G09G 5/18* (2006.01)

(52) U.S. Cl.
CPC ............... *G06F 3/0416* (2013.01); *G09G 5/18* (2013.01)

(58) Field of Classification Search
USPC ............ 345/173, 174, 211, 213; 705/35; 348/473, 524
See application file for complete search history.

(56) References Cited

U.S. PATENT DOCUMENTS

| 5,124,804 | A | * | 6/1992 | Socarras | G09G 5/18 348/524 |
|---|---|---|---|---|---|
| 5,646,675 | A | * | 7/1997 | Copriviza | H04H 20/14 348/E7.036 |
| 7,441,233 | B1 | | 10/2008 | Orndorff et al. | |
| 2002/0085118 | A1 | * | 7/2002 | Harris | H04H 20/31 248/473 |
| 2005/0171879 | A1 | * | 8/2005 | Lin | 705/35 |
| 2008/0036743 | A1 | | 2/2008 | Westerman et al. | |
| 2008/0082930 | A1 | | 4/2008 | Omernick et al. | |
| 2008/0162997 | A1 | | 7/2008 | Vu et al. | |
| 2008/0165141 | A1 | | 7/2008 | Christie | |
| 2009/0224776 | A1 | | 9/2009 | Keith | |
| 2010/0097343 | A1 | | 4/2010 | Fang | |
| 2010/0134437 | A1 | | 6/2010 | Yang et al. | |
| 2010/0235732 | A1 | | 9/2010 | Bergman | |
| 2010/0238130 | A1 | * | 9/2010 | Lin et al. | 345/173 |
| 2010/0253639 | A1 | | 10/2010 | Huang et al. | |
| 2011/0122088 | A1 | | 5/2011 | Lin et al. | |

(Continued)

FOREIGN PATENT DOCUMENTS

| CN | 101673155 | 3/2010 |
|---|---|---|
| CN | 102187298 | 9/2010 |

*Primary Examiner* — Thuy Pardo

(57) ABSTRACT

A touch-screen input/output device including a touch sensor, a display, a display control module, a touch sensor control module and a synchronizer module. The touch sensor is overlaid on a display. The display control module is communicatively coupled to the display and converts video data into a serial bit stream video display signal including one or more blanking intervals. The touch sensor control module is communicatively coupled to the touch sensor and determines touch events and location of the touch event on the touch sensor during one or more touch sensor scan cycles. The synchronizer module is communicatively coupled between the display control module and the touch sensor control module, and interleaves the one or more touch sensor scan cycles with the one or more blanking intervals of the video display signal.

3 Claims, 11 Drawing Sheets

(56) References Cited

U.S. PATENT DOCUMENTS

| | | |
|---|---|---|
| 2011/0127340 A1 | 6/2011 | Aiken |
| 2011/0181519 A1* | 7/2011 | Tsai et al. .............. 345/173 |
| 2012/0019467 A1 | 1/2012 | Hotelling et al. |
| 2012/0030623 A1 | 2/2012 | Hoellwarth |
| 2012/0050206 A1 | 3/2012 | Welland |
| 2012/0054379 A1 | 3/2012 | Leung et al. |
| 2012/0084798 A1 | 4/2012 | Reeves et al. |
| 2012/0176327 A1* | 7/2012 | Na et al. ................ 345/173 |
| 2012/0176546 A1 | 7/2012 | Yoon |
| 2012/0262463 A1 | 10/2012 | Bakalash et al. |
| 2013/0038587 A1* | 2/2013 | Song ............... G09G 5/18 345/211 |
| 2013/0069894 A1* | 3/2013 | Chen et al. ............. 345/173 |
| 2014/0340387 A1* | 11/2014 | Song ............... G09G 5/18 345/213 |

* cited by examiner

TOUCH-SCREEN INPUT/OUTPUT DEVICE TOUCH SENSING TECHNIQUES

CROSS-REFERENCE TO RELATED APPLICATIONS

This application claims the benefit of U.S. Provisional Patent Application No. 61/584,798 filed Jan. 9, 2012.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, e-readers, smart phones, servers, and the like have facilitated increased productivity and reduced costs in communicating and analyzing data in most areas of entertainment, education, business, and science. One common aspect of a number of computing systems is the touch-screen input/output interface. The touch-screen input/output interface includes a display and a touch sensor overlaid on the display. The display may typically be a cathode ray tube (CRT), liquid crystal display (LCD), plasma, light emitting diode (LED), or the like type display. The display is utilized to display items such as alphanumeric, characters, icons, cursor, pictures, graphics, drawings and/or the like to a user. The touch sensor may typically be a resistive, capacitive, or surface acoustic wave type touch sensor. The touch sensor is utilized to detect a localized activation (e.g., touch) by a user on the touch-screen input/output interface. In a number of cases the localized activation detected by the touch sensor corresponds to one or more items on the display. For example, the display may output a graphical user interface, including a plurality of selectable buttons, for an application. Touching, a given button on the display by a user may be input to the application as a corresponding user input. The touch-screen input'output device therefore enables the user to interact directly with what is displayed, rather than indirectly through another input/output device such as a point device or navigation key.

Referring to FIG. 1, an exemplary computing device according to the conventional art is shown. The computing device 100 includes one or more processors 105 communicatively coupled to one or more memories 110, and one or more peripheral devices including a touch-screen input/output device 115-130. It is appreciated that the computing device 100 typically includes numerous other devices, components, peripherals, communication busses, and sub-systems, such as chip sets (e.g., northbridge and southbridge), volatile and non-volatile memories, network interfaces, and the like. The devices are not shown and discussed because they are well known in the art and not germane to an understanding of embodiments of the present technology.

The touch-screen input/output device 115-130 includes a display 115 and a touch sensor 120 overlaid on the display 115. The display 115 is communicatively coupled to one or more processors 105 through its corresponding display control module 125. The touch sensor 120 is communicatively coupled to one or more processors 105 through its corresponding touch sensor control module 130. It is appreciated that the display 115, display control module 125, touch sensor 120 and touch control module 130 may be implemented as an external peripheral, may be implemented as an internal peripheral, or any other combination. The display control module converts video data into a serial bit stream. The touch control module detects touch events and the location of the touch events on the touch sensor. Typically the touch location is determined as an x-y coordinate based position.

Touch-screen input/output interface are becoming ever increasing more popular in computing devices such as smart phones, handheld gaming systems, laptop PCs, tablet PCs, netbooks, e-readers and the like. As the use of touch-screen input/output interfaces continues to increase, there is a continuing need for improved display sub-systems, touch sensor sub-systems, and/or touch-screen input/output interface sub-systems.

SUMMARY OF THE INVENTION

The present technology may best be understood by referring to the following description and accompanying drawings that are used to illustrate embodiments of the present technology directed toward touch-screen input/output device touch sensing techniques.

In one embodiment, frames of pixel data are scanned out to a display during trace intervals. The touch sensor array is scanned during vertical blanking intervals between the frames of pixel data. In another embodiment, lines of a frame of pixel data are scanned out. Each of a plurality of portions of the touch sensor array are scanned during a corresponding horizontal blanking interval between the lines of pixel data. In yet another embodiment, frames of pixel data are scanned out with vertical blanking intervals between the frames and horizontal blanking intervals between the lines of pixel data. Each of a plurality of portions of the touch sensor array are scanned during a corresponding horizontal blanking interval between the lines of pixel data. In addition, a full scan of the touch sensor array is performed during vertical blanking intervals. In one or more implementations, the vertical and/or horizontal blanking intervals are extended to enable scanning the touch sensor array between frames and/or line of the pixel data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
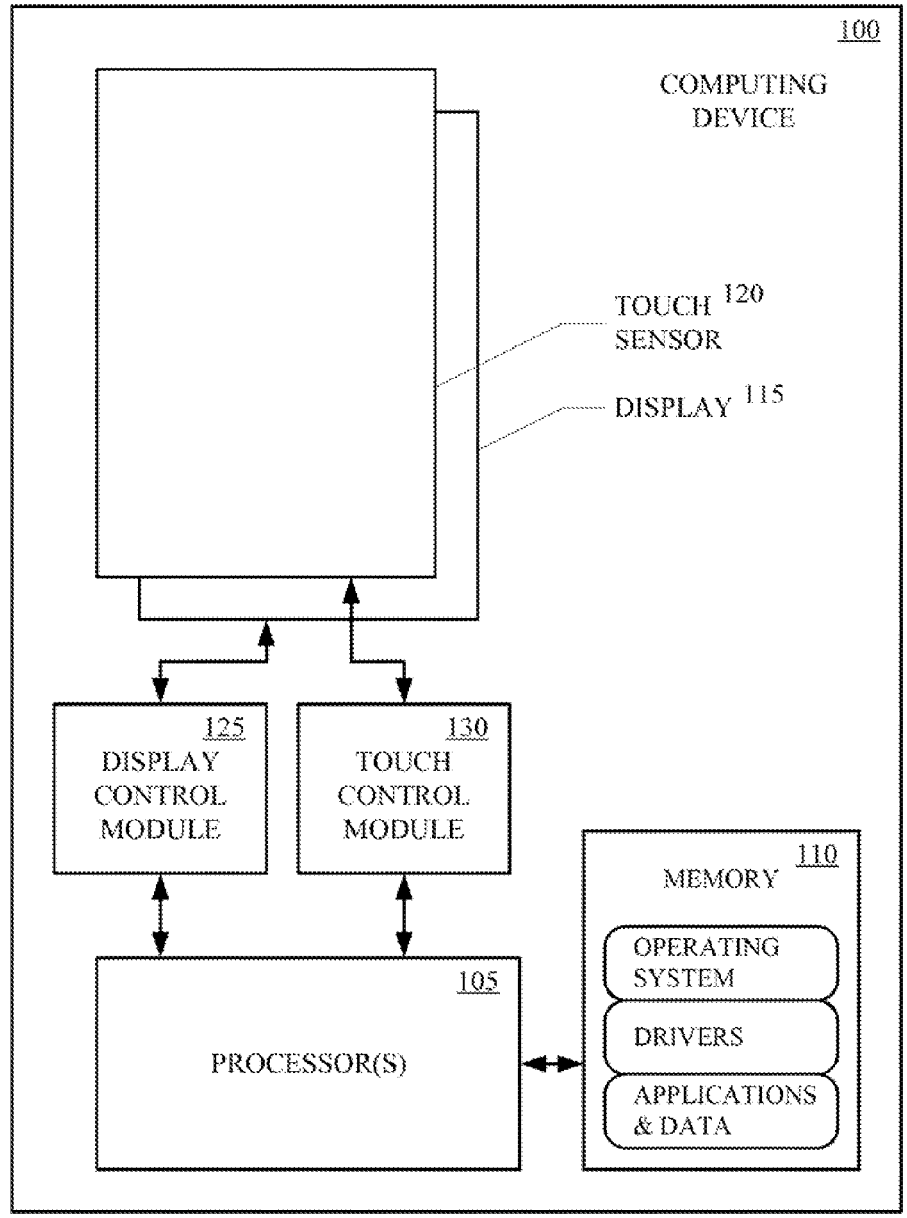
FIG. 1 shows a block diagram of an exemplary computing, device according to the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device, that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Figure 2:
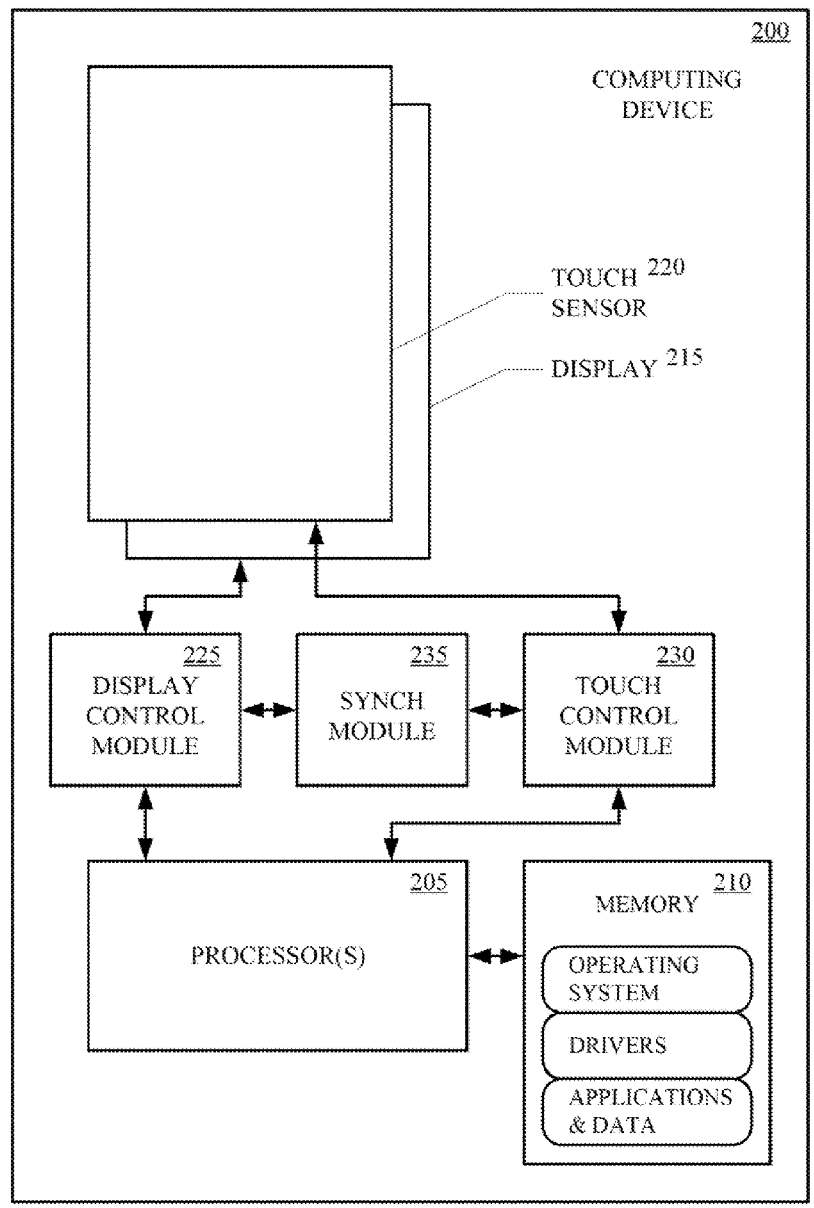
FIG. 2 shows a block diagram of a computing device, in according with one embodiment of the present technology.

Referring to FIG. 2, a computing device, in according with one embodiment of the present technology, is shown. The computing device 200 includes one or more processors 205 communicatively coupled to one or more memories 210, and one or more peripheral devices including a touch-screen input/output device 215-235. The computing device also typically includes numerous other devices, components, subsystems, peripheral and/or the like, which are not necessary to an understanding of embodiments of the present technology and therefore are not discussed herein.

The touch-screen input/output device 215-235 includes a display 215 and a touch sensor 220 overlaid on the display 215. The display 215 is communicatively coupled to one or more processors 205 through its corresponding display control module 225. The touch sensor 220 is communicatively coupled to one or more processors 205 through its corresponding touch sensor control module 230. In addition, the display control module 225 and touch sensor control module 230 are communicatively coupled together by a synchronization module 235. It is appreciated that the display 215, display control module 225, touch sensor 220, touch sensor control module 230, and synchronization module 235 may be implemented as an external peripheral or may be implemented as an internal peripheral. It is further appreciated that there are a number of other ways that the display 215, display control module 225, touch sensor 220, touch sensor control module 230 and synchronization module 235 may be implemented. For example, the touch sensor 220 and display 215 may be implemented as an external peripheral, and the display control module 225, touch control module 230 and synchronization module 235 may be implemented internally integrated with other subsystems of the computing device 200.

The display control module 225 converts video data into a serial bit stream output in a synchronous video display signal. The video display signal includes horizontal blanking intervals between each scan line and vertical blanking intervals between each frame. The touch sensor 220 may be a resistive, capacitive, surface acoustic wave, or the like panel. In a capacitive touch sensor, an object such as the finger of a user alters the localized capacitance on the sensor. The touch sensor control module 230 can determine a touch event and the location of the touch indirectly from the change in the capacitance. In one implementation, the touch sensor control module 230 determines the capacitance by scanning an array of charged elements arranged in a matrix of rows and columns. The touch sensor control module 230 determines the capacitance at the intersection of each row and column of the touch sensor. Similarly, in a resistive touch sensor 220 a change in the electrical field across a matrix of resistive elements is determined. Typically the touch location is determined as an x-y coordinate based position.

The synchronization module 235 is adapted to interleave the touch sensor scan cycles with the blanking periods of the video display signal. In one implementation, the synchronization module 235 provides a control signal to the touch sensor control module 230 indicating the occurrence of one or more blanking intervals of the video display signal. In another implementation, the synchronization module 235 enables the display control module 225 and the touch sensor control module 230 to share a common clock and a blanking control signal indicating the occurrence of one or more blanking intervals of the video display signal. In another implementation, the synchronization module 235 provides a clock signal to the touch sensor control module 230 that is synchronized to the clock signal of the display control module 225. The synchronization module 235 also provides a blanking control signal to the touch sensor control module 230 indicating the occurrence of one or more blanking intervals of the video display signal. In yet another embodiment, the synchronization module 235 may provide a scan control signal to the touch sensor control module 230 indicating which of a plurality of scan portions of the touch sensor 220 to scan. The scan control signal is synchronized to one or more blanking intervals of the video display signal. In yet another embodiment, the synchronization module 235 may provide a scan control signal to the touch sensor control module 230 for fully scanning the touch sensor 220 that is synchronized to one or more blanking intervals of the video display signal. The one or more blanking intervals may include vertical blanking intervals, horizontal blanking intervals, or both vertical and horizontal blanking intervals in one or more implementations, the vertical, horizontal or both blanking intervals are extended to permit scanning of all or a corresponding portion of the touch sensor 220. The areas of overlap of the signals are therefore aligned such that the one or more touch sensor scans occur during the one or more blanking periods of the video display signal when no pixel values are being driven onto the display. Accordingly, embodiments of the present embodiment advantageously avoid interference issues. In comparison, pixel values driven onto the display during touch sensor scanning that occur in the conventional an techniques can cause electrical interference that increase touch event and/or position sensing errors.

During active display scan times when the information is being written to the display pixels, noise is generated which interferes with reading the touch sensor. In the conventional art, noise generated by writing the data to display elements during scanning of the touch sensor needs substantial filtering to accurately read the sense nodes of the touch sensor. Alternatively, the voltage to the touch sensor needs to be increased to accurately read the sense nodes of the touch sensor. In contrast, when information is not being written to the display transistors during blanking intervals there is little or no noise induced by the display in the touch sensor. During horizontal blanking, the display is not being written to and as a result the display is quiet (e.g., little or no noise generated). Scanning the touch sensor, in accordance with embodiments of the present technology, during the horizontal blanking interval increases accuracy because the noise is less than during active display scan cycles. During vertical blanking, the interval is even longer than horizontal blanking and therefore there is a longer period in which little or no noise is generated in the touch sensor by the display.

Figure 3:
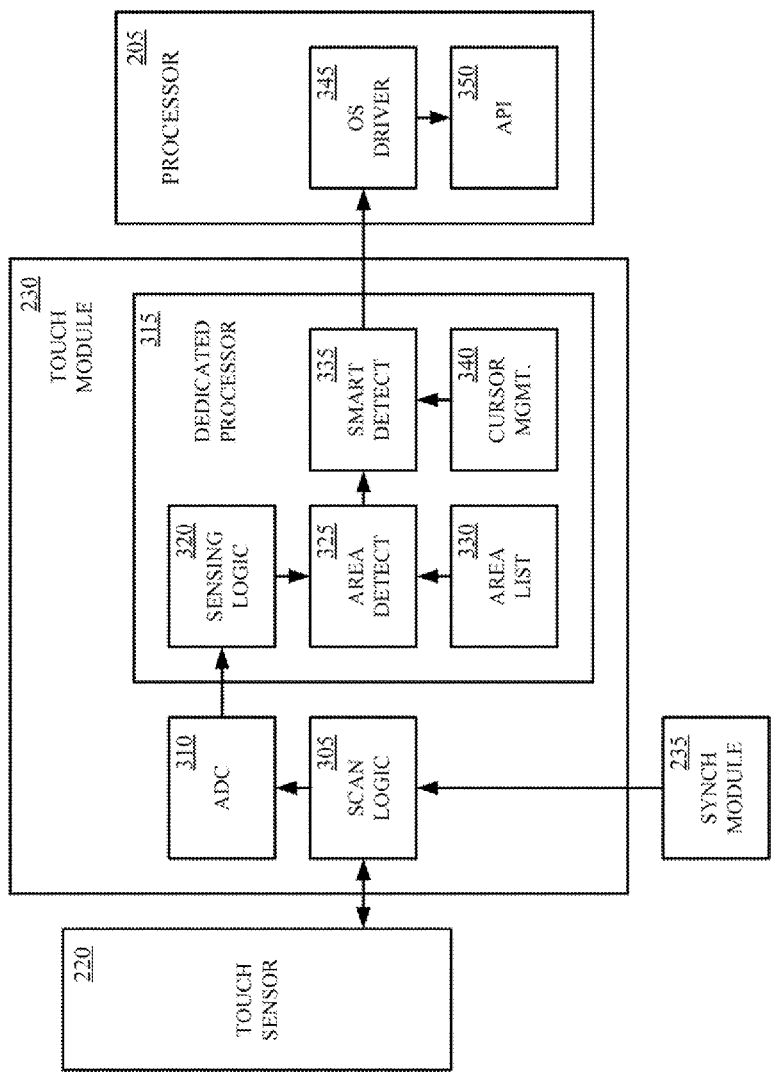
FIG. 3 shows a block diagram of a more detailed representation of the touch sensor, touch sensor control module, synchronization module, and processor of the computing device, in accordance with one embodiment of the present technology.

Referring, now to FIG. 3, a more detailed representation of the touch sensor 220, touch sensor control module 230, synchronization module 235, and processor 205 of the computing device 200, in accordance with one embodiment of the present technology, is shown. The touch sensor control module 230 may include scan logic 305, an analog-to-digital converter (ADC) 310, and a dedicated processor (e.g., microcontroller, embedded processor) 315. The scan logic 305 is communicatively coupled to the touch sensor panel 220 the synchronization module 235, and the analog-to-digital converter 310. The scan logic 305 controls, for example, the sensing of the capacitive elements along the grid of columns and rows to provide charge levels across a serial port interface (SPI) to the analog-to-digital converter 310. The analog-to-digital converter 310 converts the charge levels to digital charge data regarding the capacitive surface of the touch sensor for each touch sensor scan interval. The dedicated processor 315 receives the digital charge data for the touch sensor from the analog-to-digital converter 310 across a serial port interface (SPI). The dedicated processor 315 converts the data to touch events and location information for each touch sensor scan interval. The dedicated processor 315 provides event detection, area detection, tracking, noise elimination, and other communication/scheduling functions. In one implementation, the dedicated processor 315 of the touch sensor control module 230 may be a 32-bit microcontroller. The dedicated processor may include sensing logic 320 area detection logic 325, area list data 330, smart detection logic 335, and cursor management 340.

In one implementation, the synchronization module 235 provides a control signal to the scan logic 305 indicating the occurrence of one or more blanking intervals of the video display signal. In another implementation, the synchronization module 235 enables the display control module 225 and the scan logic 305 of the touch sensor control module 230 to share a common dock and a blanking control signal indicating the occurrence of one or more blanking intervals of the video display signal. In another implementation, the synchronization module 235 provides a clock signal to the scan logic 305 that is synchronized to the clock signal of the display control module 225. The synchronization module 235 also provides a blanking control signal to the scan logic 305 indicating the occurrence of one or more blanking intervals of the video display signal. In yet another embodiment, the synchronization nodule 235 may provide a scan control signal to the scan logic 305 indicating which of a plurality of scan portions of the touch sensor 220 to scan. The scan control signal is synchronized to the horizontal blanking intervals of the video display signal. In yet another embodiment, the synchronization module 235 may provide a scan control signal to the scan logic 305 for fully scanning the touch sensor 220 during the vertical blanking intervals of the video display signal. In one or more implementations, the vertical, horizontal or both blanking intervals are extended to permit scanning of all or a corresponding portion of the touch sensor 220.

The general purpose processor 205 executes sets of computing device executable instructions to implement one or more operating system (OS) drivers 345, one or more application programming interfaces (API) 350, an operating system, one or more user mode applications and/or the like. The operating system driver 345 receives information indicating valid touch events and the x-y coordinates of the valid touch events. The operating, system driver 345 may convert the valid touch events and the x-y coordinates thereof to appropriate inputs to one or more user applications through corresponding application programming interfaces 350.

Figure 4:
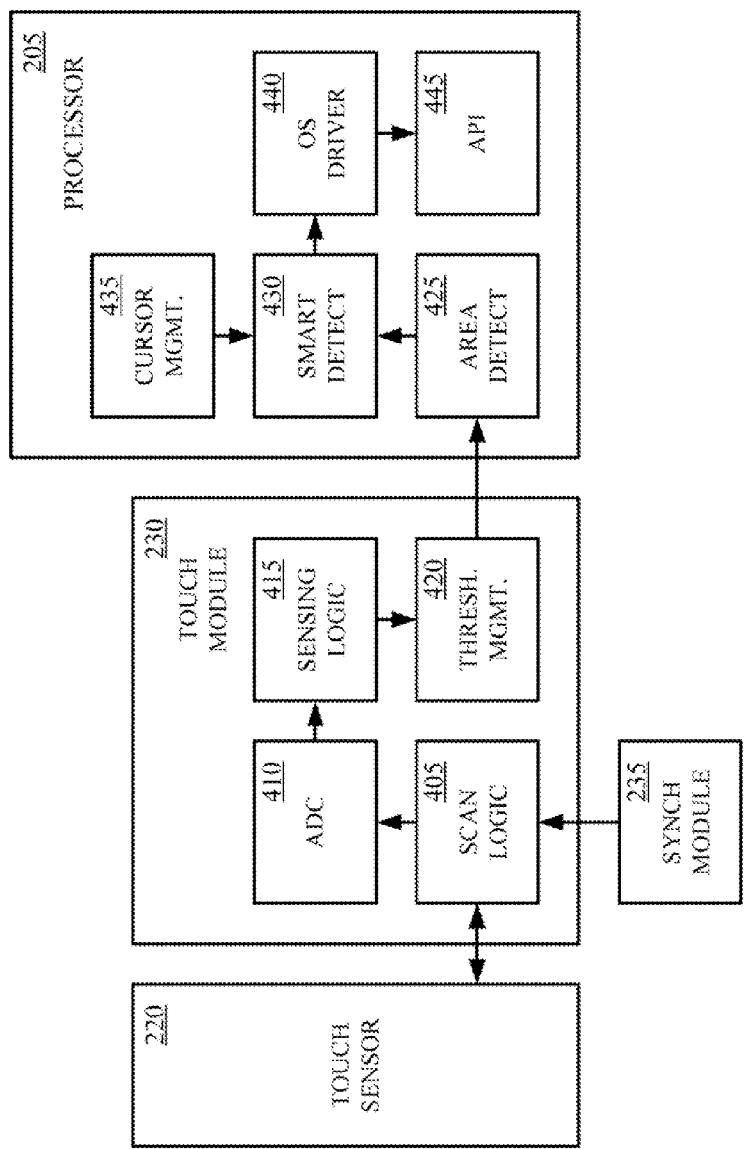
FIG. 4 shows a block diagram of another representation of the touch sensor, touch sensor control module, synchronization module, and processor of the computing device, in accordance with one embodiment of the present technology.

Referring now to FIG. 4, another representation of the touch sensor 220, touch sensor control module 230, synchronization nodule 235, and processor 205 of the computing device, in accordance with one embodiment of the present technology, is shown. The touch sensor control module 230 may include scan logic 405, an analog-to-digital converter 410, sensing logic 415, and threshold management logic 420. Therefore, the touch module 230 is a state machine in this embodiment, and does not include a dedicated processor.

The scan logic 405 is communicatively coupled to the touch sensor panel 220 the synchronization module 235, and the analog-to-digital converter 410. The scan logic 405 controls, for example, the sensing of the capacitive elements along the grid of columns and rows to provide charge levels across a serial port interface (SPI) to the analog-to-digital converter 410. The analog-to-digital converter 410 converts the charge levels to digital charge data regarding, the capacitive surface of the touch sensor for each touch sensor scan interval. The sensing logic 415 detects potential touch events and potential touch event location data for each touch sensor scan interval. The threshold management 420 compares the potential touch events and potential touch event location data to predetermined limits to determine touch events and locations that satisfy a predetermined level of accuracy. Therefore, the state machine completes minimal processing to transmit reliable touch events and location information.

In one implementation, the synchronization module 235 provides a control signal to the scan logic 405 indicating the occurrence of one or more blanking intervals of the video display signal. In another implementation, the synchronization module 235 enables the display control module 225 and the scan logic 405 of the touch sensor control module 230 to share a common clock and a blanking control signal indicating, the occurrence of one or more blanking intervals of the video display signal. In another implementation, the synchronization module 235 provides a clock signal to the scan logic 405 that is synchronized to the clock signal of the display control module 225. The synchronization module 235 also provides a blanking control signal to the scan logic 405 indicating the occurrence of one or more blanking intervals of the video display signal. In yet another embodiment, the synchronization module 235 may provide a scan control signal to the scan logic 405 indicating which of a plurality of scan portions of the touch sensor 220 to scan. The scan control signal is synchronized to the horizontal blanking, intervals of the video display signal. In yet another embodiment, the synchronization module 235 may provide a scan control signal to the scan logic 405 for fully scanning the touch sensor 220 during the vertical blanking intervals of the video display signal. In one or more implementations, the vertical, horizontal or both blanking intervals are extended to permit scanning of all or a corresponding portion of the touch sensor 220.

The general purpose processor 205 executes sets of computing device executable instructions to implement an area detect utility 425, a smart detect utility 430, a cursor management utility 435, one or more operating system drivers 440, one or more application programming interfaces 445, an operating system, one or more user mode applications, and/or the like. The operating system driver 440 receives information indicating valid touch events and the x-y coordinates of the valid touch events. The operating system driver 440 may convert the valid touch events and the x-y coordinates thereof to appropriate inputs to one or more user applications through corresponding application programming interfaces 445.

The state machine is adapted to eliminate potential touch events and locations that do not satisfy the predetermined accuracy level. Accordingly, the state machine transmits reliable touch data and does not wake up the general purpose processor 205 for data that has a substantial likelihood of being inaccurate. Embodiments therefore eliminate many time consuming and computationally heavy processing tasks for the touch sensor control module 230, and pushes them to the general purpose processor 205. The operating system can then decide how fast and accurate results are needed from the touch-screen input/output device and will apply the necessary amount of processing resources to the tasks. Configuration, fine tuning and updates for touch screen performance can advantageously be done with operating system updates and there is little or no need to change any firmware in the touch screen control module 230. By eliminating the need for a dedicated processor in the touch sensor control module 230 there are other components like volatile memory, non-volatile memory, docks, power regulators and the like, needed to run a microcontroller, that are eliminated. Accordingly, the price of the touch-screen input/output device may be reduced. In addition, the state machine requires less power to perform the scanning, of data compared to the dedicated processor. Furthermore, the general purpose processor 205 and the operating system are already running and are typically performing many other tasks. The additional processing power required for touch detection specific tasks in the general purpose processing unit 205 are relatively little compared to the other tasks already running in the system. The reduced power advantageously extends the operating time of battery powered devices such as smart phones, portable game consoles and the like.

Figure 5:
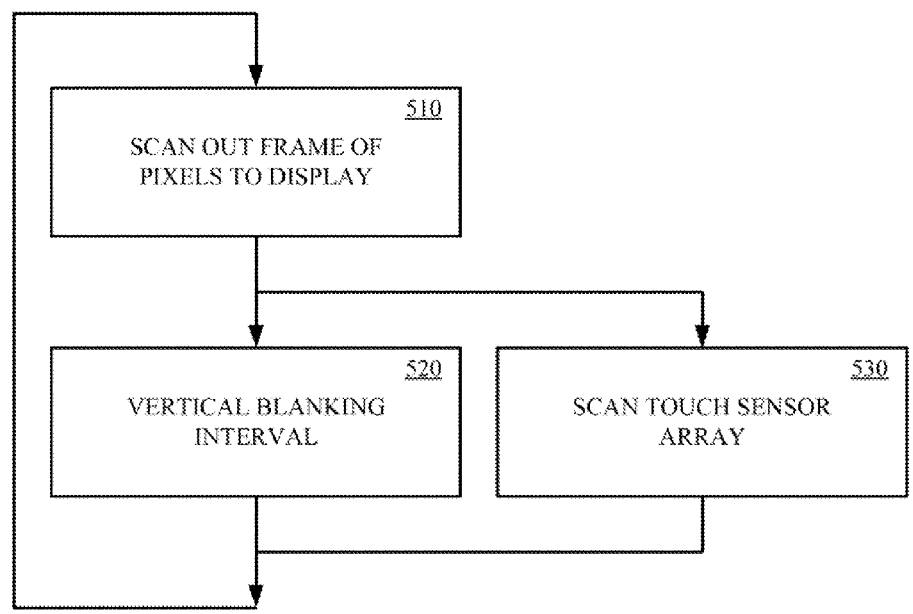
FIG. 5 shows a flow diagram of a method of outputting a video display signal on the display while scanning the touch sensor, in accordance with one embodiment of the present technology.
Figure 6:
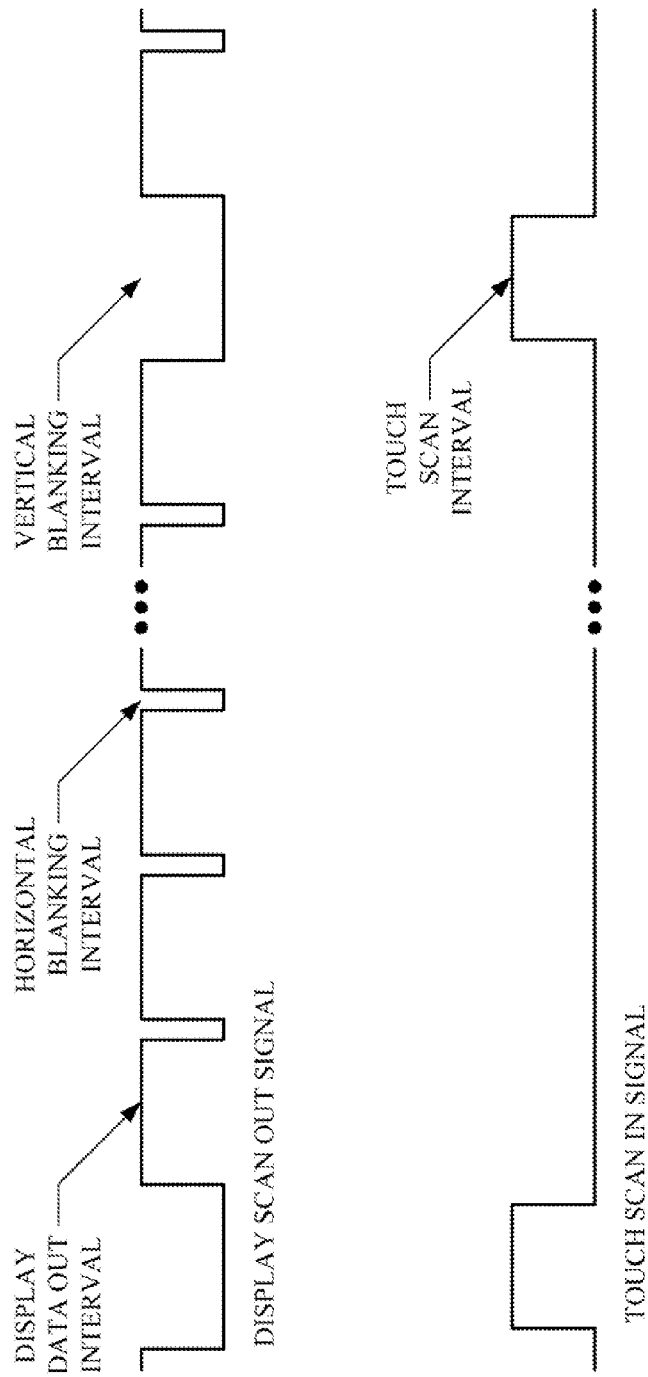
FIG. 6 shows a timing diagram illustrating a video display signal and a touch screen scan signal, in accordance with one embodiment of the present technology.

Operation of the computing device, in accordance with embodiments of the present technology, will be further explained with reference to FIGS. 5-10. Referring now to FIG. 5, a method of outputting a video display signal on the display while scanning the touch sensor, in accordance with one embodiment of the present technology, is shown. The method is further explained with reference to FIG. 6, which illustrates a timing diagram of a video display signal and a touch screen scan signal. At 510, a frame of pixel data is output to the display during a trace interval. In one implementation, the display control module 225 outputs a serial bit stream including frames of pixel data during display data out intervals. Between each frame of pixel data there is a vertical blanking interval, at 520. In one implementation, the vertical blanking, interval may be extended to enable scanning the touch sensor array between frame trace intervals.

During the vertical blanking interval, the touch sensor array is scanned to determine the position of any touch events that occur, at 530. In one implementation, the touch sensor control module 230 determines a touch event and the location of the touch indirectly from a change in the capacitance, resistance or the like of the touch sensor 220. In one implementation, the scan logic 305, 405 controls the sensing of the capacitive, resistive or the like elements along the grid of columns and rows to provide charge levels across a serial port interface (SPI) to the analog-to-digital converter 310, 410. The scan logic 305, 405 controls the sensing according to one or more clocks and/or control signals from the synchronization module 235.

In one implementation, the synchronization module 235 provides a blanking control signal to the scan logic 305, 405 indicating the occurrence of the vertical blanking intervals of the video display signal. In another implementation, the synchronization module 235 enables the display control module 225 and the scan logic 305, 405 of the touch sensor control module 230 to share a common clock and a blanking control signal indicating the occurrence of vertical blanking intervals.

The processes at 510-530 are iteratively repeated to display additional video data and detect touch events and the position thereof. Scanning the touch sensor during the vertical blanking interval advantageously reduces interference that would be induced when driving the TFT capacitor/transistor elements on an LCD display panel for example.

Figure 7:
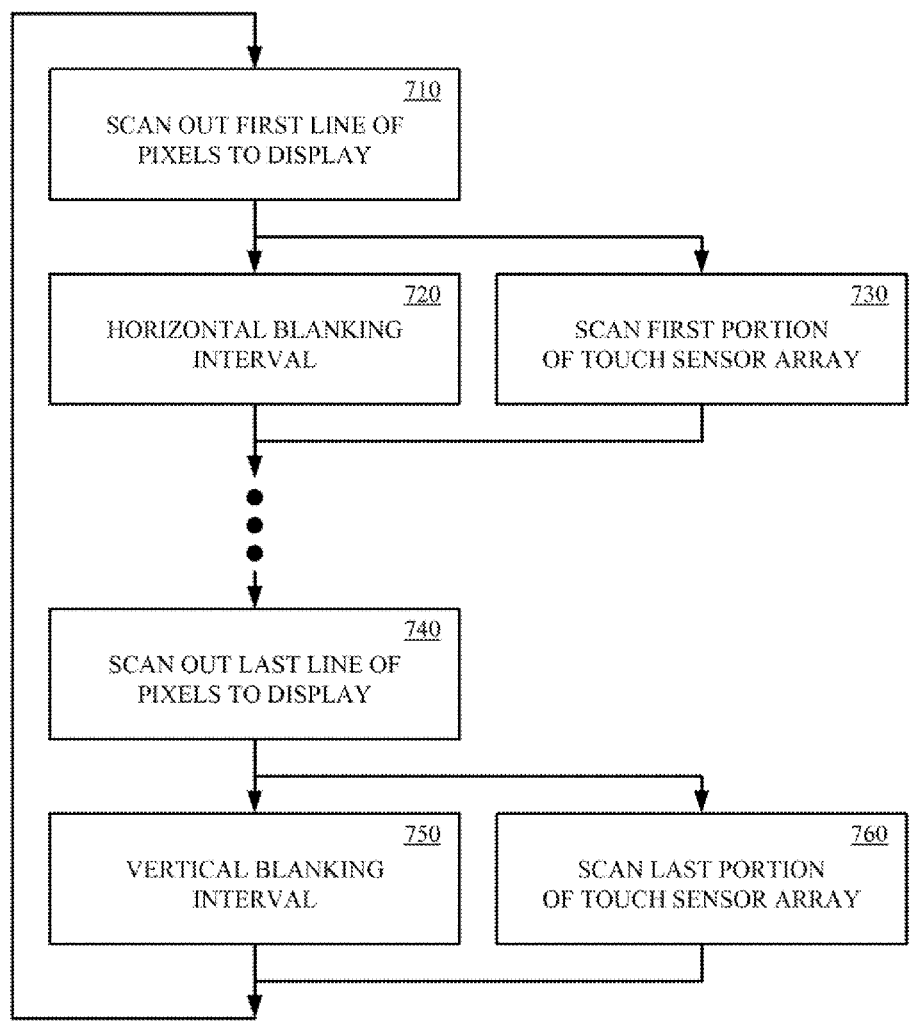
FIG. 7 shows a flow diagram of a method of outputting a view display signal on a display while scanning the touch sensor, in accordance with another embodiment of the present technology.

Referring now to FIG. 7, a method of outputting a view display signal on a display while scanning the touch sensor, in accordance with another embodiment of the present technology, is shown. The method is further explained, with reference to FIG. 8, which illustrates a timing diagram of a view display signal and a touch screen scan signal. At 710 and 740, each of a plurality of lines of pixel data is output to the display. In one implementation, the display control module 225 outputs frames including a plurality of lines of pixel data during, display data out intervals. Between each line of pixel data there is a horizontal blanking, interval, at 720. In one implementation, the horizontal blanking interval may be extended to enable scanning the touch sensor array between line trace intervals.

During each horizontal blanking interval, the corresponding portion of the touch sensor array is scanned to determine the position of any touch events that occur, at 730. The touch sensor area is partitioned into one less portion than there are scan lines in the frame of data, so that the entire touch sensor is scanned during the horizontal blanking intervals. As a result, the scanning of each portion of the touch sensor may be interleaved, during the corresponding horizontal blanking intervals, with driving lines of pixel data on the display panel. In one implementation, the touch sensor control module 230 determines a touch event and the location of the touch indirectly from a change in the capacitance, resistance or the like of a corresponding portion of the touch sensor 220. In one implementation, the scan logic 305, 405 controls the sensing of the corresponding portion of capacitive, resistive or the like elements along the grid of columns and rows to provide charge levels across a serial port interlace (SPI) to the analog-to-digital converter 310, 410. The scan logic 305, 405 controls the sensing of a corresponding portion according to one or more clocks and/or control signals from the synchronization module 235.

In one implementation, the synchronization module 235 provides a blanking control signal to the scan logic 305, 405 indicating the occurrence of the horizontal blanking intervals of the video display signal. In another implementation, the synchronization module 235 enables the display control module 225 and the scan logic 305, 405 of the touch sensor control module 230 to share a common clock and a blanking control signal indicating the occurrence, of horizontal blanking intervals. In yet another embodiment, the synchronization module 235 may provide a scan control signal to the scan logic 305, 405 indicating which of a plurality of scan portions of the touch sensor 220 to scan. The scan control signal is synchronized to the horizontal blanking intervals of the video display signal.

Figure 8:
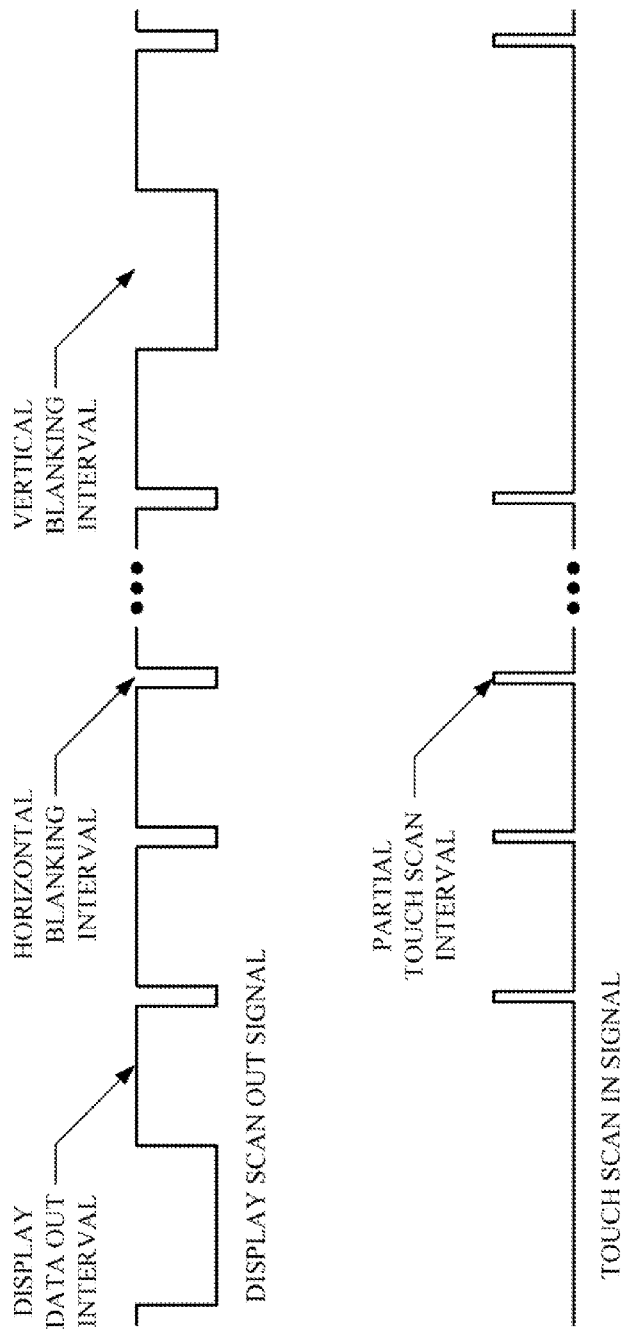
FIG. 8 shows a timing diagram illustrating a video display signal and a touch screen scan signal, in accordance with another embodiment of the present technology.

After an entire frame of pixel data is output to the display, there is a vertical blanking interval, at 750. It is appreciated that the last portion of the touch sensor may be scanned during the vertical blanking interval, at 760. Alternatively, the touch sensor area may be partitioned into one less portion than there are scan lines in the frame of data, so that the entire touch sensor is scanned during the horizontal blanking intervals, as illustrated in FIG. 8. In one implementation, the horizontal blanking interval may be extended to enable scanning the touch sensor array between the scan out of each line of pixel data. The processes at 710-760 are iteratively repeated to display additional video data and detect touch events and the position thereof. Scanning portions of the grid of capacitive touch sensor during the corresponding horizontal blanking interval advantageously reduces interference that would be induced when driving the TFT capacitor/transistor elements on the LCD display panel for example.

Figure 9A:
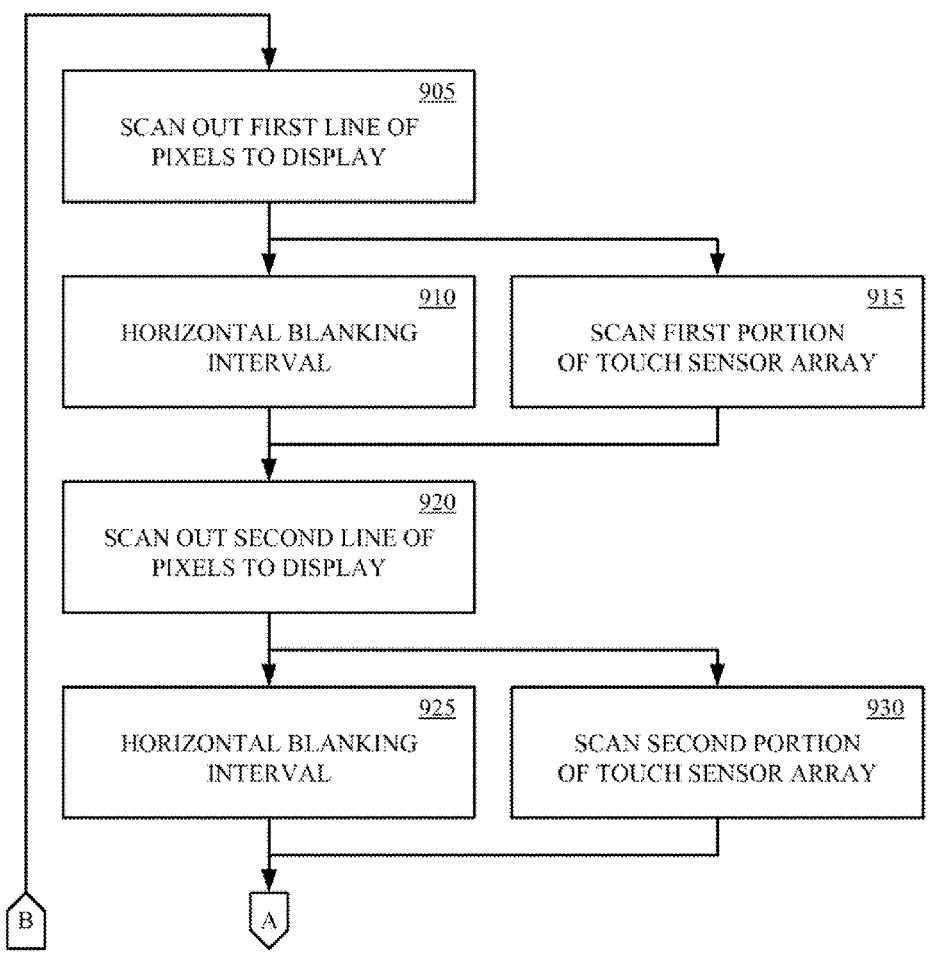
FIGS. 9A and 9b show a flow diagram of a method of outputting a view display signal on a display while scanning the touch sensor, in accordance with yet another embodiment of the present technology.
Figure 9B:
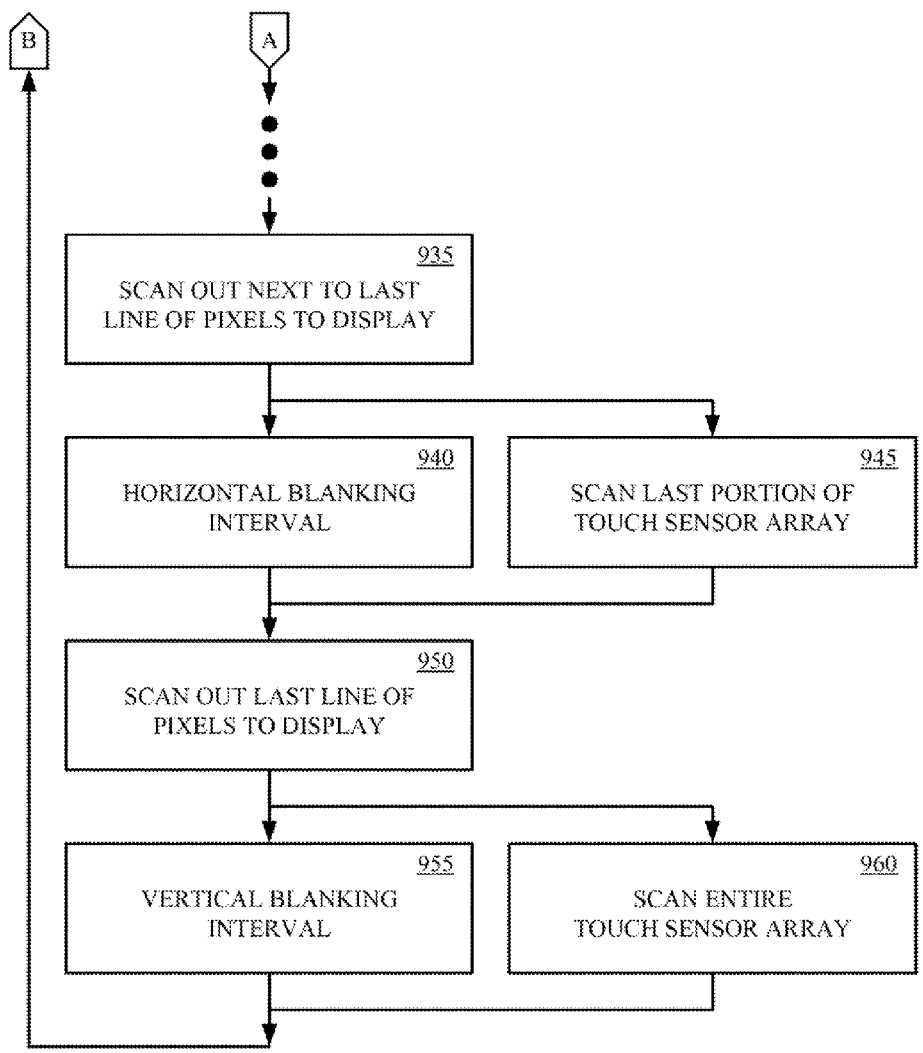
Figure 10:
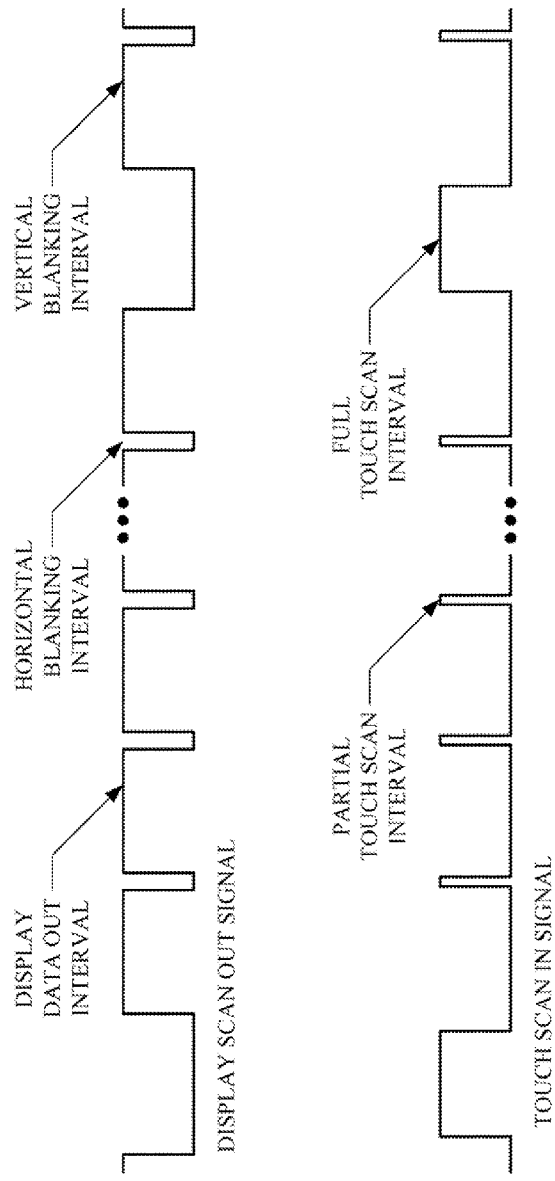
FIG. 10 shows a timing diagram illustrating a timing diagram of a view display signal and a touch screen scan signal, in accordance with yet another embodiment of the present technology.

Referring now to FIGS. 9A-9B, a method of outputting a view display signal on a display while scanning the touch sensor, in accordance with yet another embodiment of the present technology, is shown. The method is further explained with reference to FIG. 10, which illustrates a timing diagram of a view display signal and a touch screen scan signal. At 905, 920, 935 and 950, each of a plurality of lines of pixel data is output to the display. In one implementation, the display control module 225 outputs frames including a plurality of lines of pixel data during display data out intervals. Between each line of pixel data there is a horizontal blanking interval, at 910, 925, and 940. In one implementation, the horizontal blanking interval may be extended to enable scanning the touch sensor array between line trace intervals.

During each horizontal blanking interval, the corresponding portion of the touch sensor array is scanned to determine the occurrence of any touch event, at 915, 930 and 945. The touch sensor area is partitioned into one less portion than there are scan lines in the frame of data, so that the entire touch sensor is scanned during the horizontal blanking intervals. As a result, the scanning of each portion of the touch sensor may be interleaved, during the corresponding horizontal blanking intervals, with driving lines of pixel data on the display panel. In one implementation, the touch sensor control module 230 determines a touch event and the location of the touch indirectly from a change in the capacitance, resistance or the like of a corresponding portion of the touch sensor 220. In one implementation, the scan logic 305, 405 controls the sensing of the corresponding portion of capacitive, resistive or the like elements along the grid of columns and rows to provide charge levels across a serial port interface (SPI) to the analog-to-digital converter 310, 410. The scan logic 305, 405 controls the sensing of a corresponding portion according to one or more clocks and/or control signals from the synchronization module 235.

In one implementation, the synchronization module 235 provides a first blanking control signal to the scan logic 305, 405 indicating the occurrence of the horizontal blanking intervals of the video display signal. In another implementation, the synchronization module 235 enables the display control module 225 and the scan logic 305, 405 of the touch sensor control module 230 to share a common clock and a first blanking control signal indicating the occurrence of horizontal blanking intervals. In yet another embodiment, the synchronization module 235 may provide a first scan control signal to the scan logic 305, 405 indicating which of a plurality of scan portions of the touch sensor 220 to scan. The first scan control signal is synchronized to the horizontal blanking, intervals of the video display signal.

After an entire frame of pixel data is output to the display, there is a vertical blanking interval, at 955. In one implementation, the vertical blanking interval may be extended to enable scanning the touch sensor array between frame trace intervals. During the vertical blanking interval, the entire touch sensor array is scanned to determine the position of any touch events that occur, at 960. In one implementation, the synchronization module 235 provides a first blanking control signal to the scan logic 305, 405 indicating the occurrence of the vertical blanking intervals of the video display signal. In another implementation, the synchronization module 235 enables the display control module 225 and the scan logic 305, 405 of the touch sensor control module 230 to share a common clock and a second blanking control signal indicating the occurrence of vertical blanking intervals. In one implementation, the synchronization module 235 may provide a second scan control signal to the scan logic 305 for fully scanning the touch sensor 220 during the vertical blanking intervals of the video display signal. The processes at 910-980 are iteratively repeated to display additional video data and detect touch events and the position thereof.

The foregoing descriptions of specific embodiments of the present technology have been presented for purposes of illustration and description. They are not intended to be exhaustive or to limit, the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A device comprising:
   a touch sensor overlaid on a display;
   a display control module communicatively coupled to the display to convert video data into a serial bit stream video display signal include one or more blanking intervals
   a touch sensor control module communicatively coupled to the touch sensor to determine touch events and location of the touch event on the touch sensor during touch sensor scan cycles; and
   a synchronizer module communicatively coupled between the display control module and the touch sensor control module to interleave the touch sensor scan cycles with the blanking intervals of the video display signal wherein an entire touch sensor array scan for one cycle is performed during vertical blanking intervals and each of a plurality of portions of the touch sensor array scan for another cycle is performed during corresponding horizontal blanking intervals between vertical blanking intervals.

2. The device of claim 1, wherein the synchronization module provides a control signal to the touch sensor module indicating the occurrence of the vertical and horizontal blanking intervals.

3. The device of claim 1, wherein the synchronization module shares a common clock between the touch sensor control module and the display control module.

* * * * *